United States Patent
Casper

(10) Patent No.: US 12,110,220 B2
(45) Date of Patent: Oct. 8, 2024

(54) TANK INVERTER

(71) Applicant: Benjamin Glade Casper, Basin City, WA (US)

(72) Inventor: Benjamin Glade Casper, Basin City, WA (US)

(73) Assignee: Benjamin Glade Casper, Basin City, WA (US)

( * ) Notice: Subject to any disclaimer, the term of this patent is extended or adjusted under 35 U.S.C. 154(b) by 0 days.

(21) Appl. No.: 17/733,209

(22) Filed: Apr. 29, 2022

(65) Prior Publication Data

US 2023/0348246 A1 Nov. 2, 2023

(51) Int. Cl.
*B66F 9/02* (2006.01)
*B65G 65/23* (2006.01)

(52) U.S. Cl.
CPC .............. *B66F 9/02* (2013.01); *B65G 65/23* (2013.01)

(58) Field of Classification Search
CPC ........... B66F 9/02; B65G 65/23; B65G 65/24; B65G 7/08
USPC ....... 414/419, 425, 568, 758, 763, 764, 767, 414/771, 772, 783, 420, 620; 294/119.2, 294/119.3; 254/31
See application file for complete search history.

(56) References Cited

U.S. PATENT DOCUMENTS

| | | | | |
|---|---|---|---|---|
| 837,944 | A * | 12/1906 | Mitchell | A01K 1/01 212/339 |
| 4,046,272 | A * | 9/1977 | Hayward | B28B 7/08 414/419 |
| 4,278,386 | A * | 7/1981 | Eranosian | B65G 65/24 248/142 |
| 6,213,352 | B1 * | 4/2001 | Boyer, Jr. | B65G 65/24 414/419 |
| 8,011,622 | B1 * | 9/2011 | Guthrie | B67D 3/0083 224/164 |
| 2007/0059151 | A1 * | 3/2007 | Hager | B67D 3/0083 414/783 |

* cited by examiner

*Primary Examiner* — Glenn F Myers
(74) *Attorney, Agent, or Firm* — Alliance IP, LLC

(57) ABSTRACT

In one embodiment, an apparatus comprises an inverter assembly comprising a base plate to interface with a bottom of an upright gas tank; a rotatable shaft; and at least one swing arm coupled to the base plate and the rotatable shaft; wherein the inverter assembly is to pivot about a horizontal axis to swing the base plate and a bottom side of an upright gas tank placed thereon in an upward arc responsive to rotation of the rotatable shaft.

18 Claims, 5 Drawing Sheets

TANK INVERTER

BACKGROUND

An upright propane tank may have a height that is greater than its diameter. An upright propane tank may have any suitable size and may hold any suitable amount of propane, e.g., approximately 100 gallons. An upright tank may sometimes be called a 420 lb. cylinder (because 100 gallons of propane weighs approximately 420 lbs.), a vertical, or an upright.

BRIEF DESCRIPTION OF THE DRAWINGS

Like reference numbers and designations in the various drawings indicate like elements.

Like reference numbers and designations in the various drawings indicate like elements.

DETAILED DESCRIPTION

Figure 1:
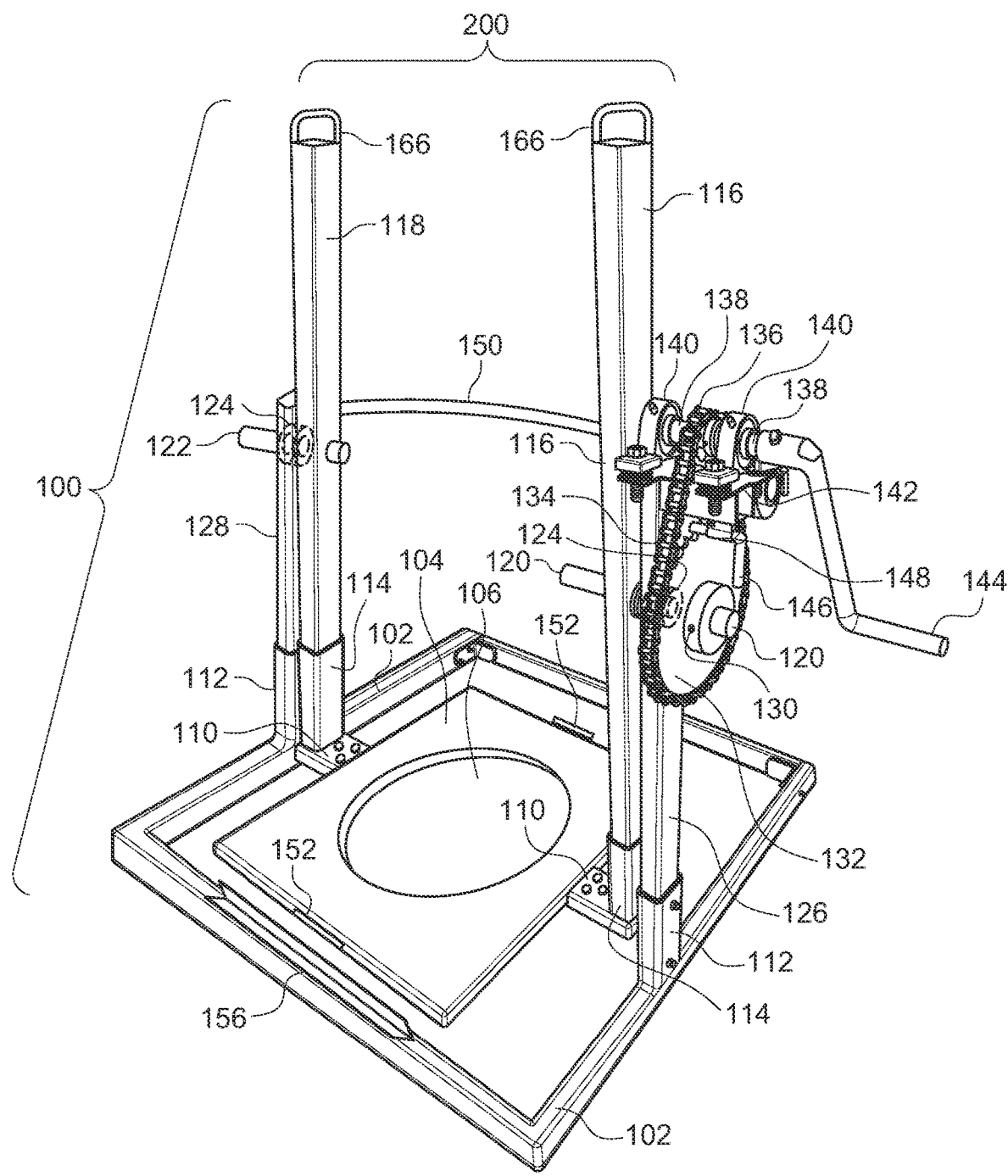
FIG. 1 illustrates a tank inverter in accordance with certain embodiments.

FIG. 1 Regulatory requirements may dictate that such tanks be completely evacuated, inspected, and the existing valves replaced with new ones on a periodic basis. These actions may involve tipping the upright tank upside down to drain the liquid, as an upright tank generally does not have liquid withdrawal tubes and corresponding valves to perform the evacuation. However, tipping a full upright tank of gas over is difficult and potentially dangerous. Moreover, there is insufficient room under the valves to attach evacuating piping if the upright tank is tipped on its own.

If an upright tank is tipped without being elevated first, clearances are tight and a valve can easily be broken off. This action may cause an immediate and catastrophic condition by exhausting pressurized liquefied petroleum gas (LPG) which is transformed into highly flammable vapor. A spark may cause an explosion that can result in great harm and damage.

Upright tanks may be inverted by relatively complex systems utilizing a turning mechanism and compressed air to raise the tank, air hoses, valves, and regulators.

FIG. 1 illustrates a tank inverter 100 in accordance with certain embodiments. In various embodiments of the present disclosure, an upright tank (whether empty, partially full, or completely full) may be set on a base plate 104. An aperture 106 in the base plate 104 allows maintenance and inspection access to the bottom of the upright tank when the upright tank is inverted. In various embodiments, even in its lowest position, the base plate 104 remains elevated above the ground, allowing the base plate 104 to swing into the air when an upright tank resting on the base plate 104 is inverted without causing the upright tank to contact the ground. In some embodiments, the upright tank may be strapped to the base plate, thereby eliminating slippage against the swinging assembly of the tank inverter 100 and protecting the upright tank from being dropped and damaged.

A base frame 102 provides a platform for stability of the tank inverter 100 and is made of tubular metal or other suitable material. The base frame 102 may have any suitable shape. For example, in the embodiment depicted, the base frame 102 has a rectangular shape. In some embodiments, at least a portion of the base frame 102 may be located outside the edges of the base plate 104. For example, in the embodiment depicted, the base frame 102 completely surrounds the base plate 104. The bottom of the base frame 102 may rest upon a ground surface.

Frame pockets 112 or other connectors are attached to opposite sides of base frame 102 and extend upwards in a vertical plane (e.g., the frame pockets 112 may be orthogonal to the base frame 102). Power frame arm 126 and frame arm 128 are inserted into frame pockets 112 and tightened by bolts and nuts or other fastening means. In some embodiments, power frame arm 126 and frame arm 128 are removably coupled to frame pockets 112 to facilitate easier shipping of the tank inverter to customers. The power frame arm 126 and frame arm 128 may extend upward from the base frame 102 and may provide support to other components of the tank inverter 100.

Bearings 124 such as bushings are located within frame arms 126 and 128. Swing arm shafts 120 and 122 are placed through (and rotate within) respective bearings 124 and are fixedly connected to respective swing arms 116 and 118 (e.g., via welds, nuts and bolts, pins, or other attachment means). Swing arm shaft 120 (which is a rotatable) continues outward from bearing 124, past the power frame arm 126, and through sprocket 132 and hub 130 and is secured to the hub (such that hub 130 rotates with the swing arm shaft 120).

Bearings 140 are mounted on frame arm extension 142, which itself is coupled to power frame arm 126. Drive shaft 138 is secured to bearings 140 and a first sprocket 136 is attached to the drive shaft 138 between bearings 140. A crank handle 144 is attached to an end of the drive shaft 138. A roller chain 134 links the first sprocket 136 to a second sprocket 132. The turning of the crank handle 144 may provide force to the drive shaft 138 that is transferred via roller chain 134 and sprockets 136 and 132 to the hub 130 and swing arm shaft 120 to provide the force used to swing the inverter swinging assembly 200.

Swing arms 116 and 118 respectively extend downward and upward from shafts 120 and 122 and are attached inside swing arm pockets 114 by bolts and nuts, welds, pins, or other fastening means. In some embodiments, swing arms 116 and 118 are removably coupled to frame swing arm pockets 114 to facilitate easier shipping of the tank inverter 100 to customers. Base plate extensions 110 are attached to swing arm pockets 114 and couple swing arms 116 to the base plate 104.

The swing arms 116 and 118 and base plate 104, along with any components coupling the swing arms to the base plate (e.g., base plate extensions 110, swing arm pockets 114, back rest 150) collectively make up the inverter swinging assembly 200. This assembly may swing (e.g., in an arc) with respect to the rest of the tank inverter 100 in order to raise or lower a tank secured to the inverter swinging assembly 200.

Pipe 148 is attached to frame arm extension 142 and aligned with teeth on sprocket 132. A pin 146 with a handle goes through pipe 148 and can move in and out. The pin 146 may be slid into a void between teeth of sprocket 132 and to lock the sprocket in any desired position, stopping movement of the sprocket 132 and inverter swinging assembly 200.

Back rest 150 is attached between swing arms 116 and 118. The back rest 150 may contact and provide support to a side of an upright tank placed in the inverter. In some embodiments, back rest 150 has a curvature that approximately matches curvature of a side of an upright tank.

Rounded corner fittings 152 are attached to base plate 104 on the front and back side, providing a smooth surface for a strap securing the tank to rest against in order to avoid premature wear.

An angle mount 156 is attached to front of base frame 102 to facilitate transfer of a tank onto the base plate.

Figure 2:
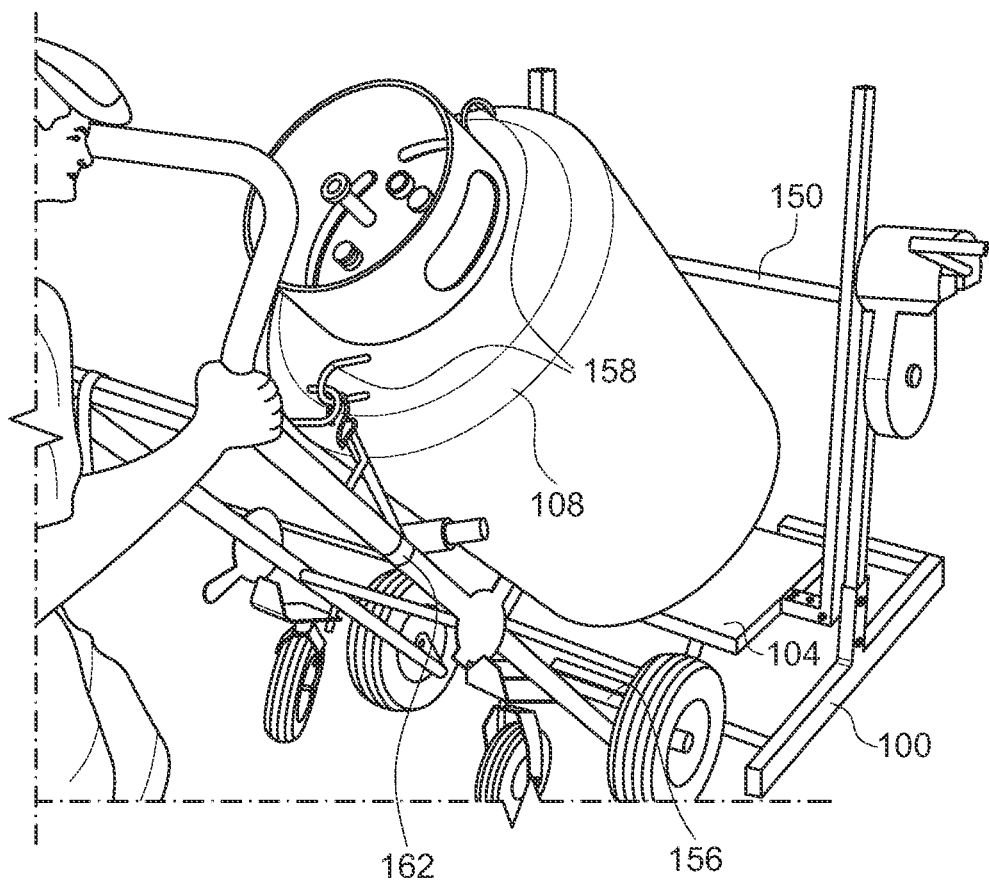
FIG. 2 illustrates an upright tank being placed on the tank inverter in accordance with certain embodiments.

FIG. 2 depicts an upright tank 108 being placed on tank inverter 100 in accordance with certain embodiments. Referring jointly to FIG. 1 and FIG. 2, the angle mount 156 (e.g., with a V-shaped recessed area) in front of the base plate 104 is attached to the base frame 102 and provides a receiving area, e.g., for a fulcrum of a tank cart 162 used to transport the upright tank 108 as the tank is lowered onto base plate 104. Thus, an upright tank 108 may be mounted on the inverter 100 in one example by rolling a tank cart 162 carrying an upright tank 108 to the inverter 100, placing a fulcrum of the tank cart into the angle mount 156, and pushing the tank onto the base plate 104 until the bottom of the tank 108 is resting on the base plate 104. In some embodiments, a crane, forklift, or other lifting device may be used in lowering the tank 108 onto or raising tank off of the base plate 104. When placed within the tank inverter, the side of the tank 108 may rest against back rest 150.

Figure 3:
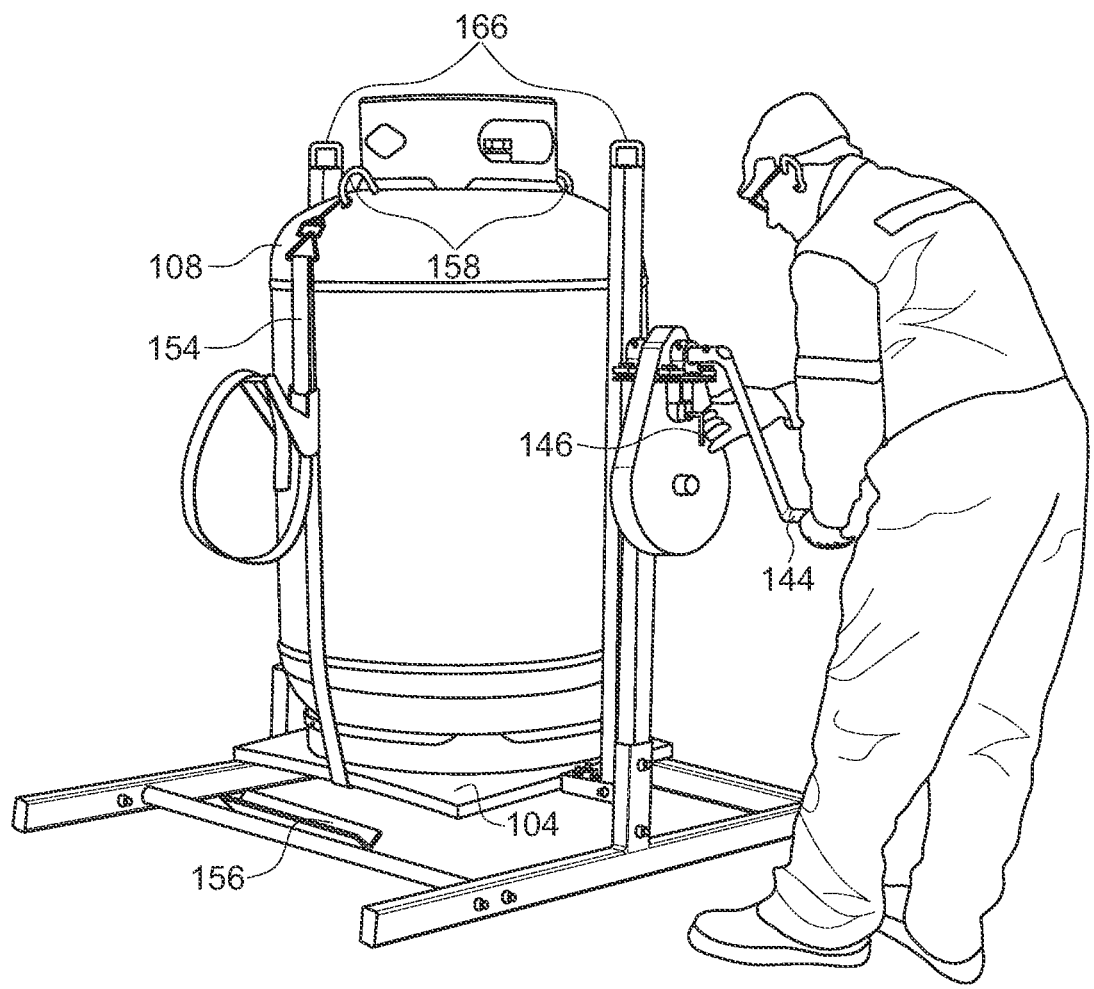
FIG. 3 illustrates an upright tank secured to the tank inverter in accordance with certain embodiments.

FIG. 3 depicts an upright tank 108 secured to tank inverter 100 via a strap 154. In various embodiments, a strap 154 may be attached (e.g., via a hook) from a front tank lifting lug 158 downward to one side of the base plate 104 (e.g., in contact with a rounded corner fitting 152), across the bottom of the base plate 104 to the other side of the base plate (e.g., in contact with the other rounded corner fitting 152), and then upward to the rear tank lifting lug 158. The strap 154 is then tightened securely. In other embodiments, a strap or other fastening mechanism may secure the upright tank 108 to the inverter swinging assembly 200 in any suitable manner. As depicted, the inversion of the tank may begin as the user removes the pin 146 from the void between the teeth of sprocket 132 and turns the crank handle 144.

Figure 4:
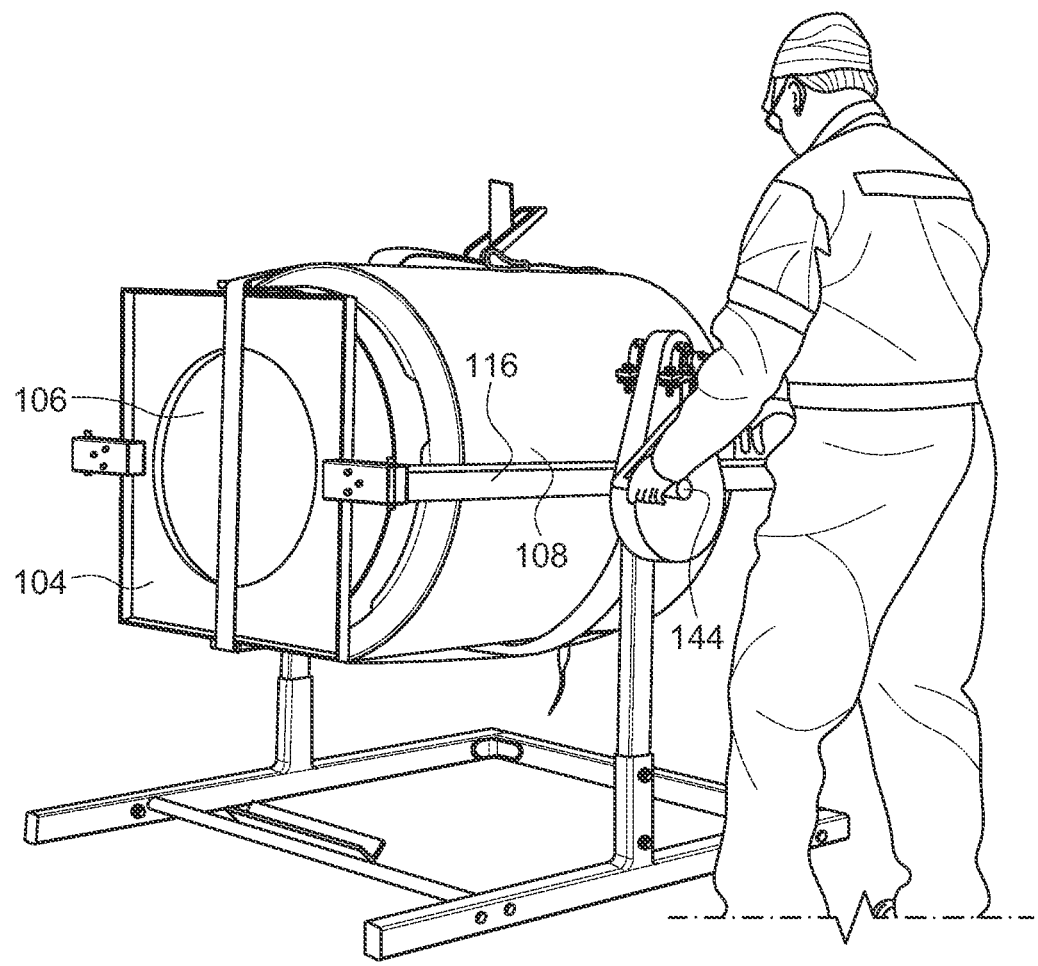
FIG. 4 illustrates an upright tank in a partially inverted position in accordance with certain embodiments.

FIG. 4 depicts an upright tank 108 in a partially inverted position in accordance with certain embodiments. Referring jointly to FIG. 4 and FIG. 1, turning the crank handle 144 turns the drive shaft 138 within bearings 140. The drive shaft turns the first sprocket 136, which is mounted on the drive shaft 138. The roller chain 134 that is placed around the first sprocket 136 drives the turning of the second sprocket 132 (which may be larger than the first sprocket 136 in some embodiments). The second sprocket 132 turns the swing arm shaft 120 within the bearing 124 and power frame arm 126. The swing arm shaft 120 is fixedly attached (e.g., welded onto) the swing arm 116, such that rotation of the swing arm shaft 120 causes the swing arm (and the rest of the inverter swinging assembly 200) to pivot around the horizontal axis of the swing arm shaft 120, thus lifting the base plate 104 up into the air (following an arc pattern).

Figure 5:
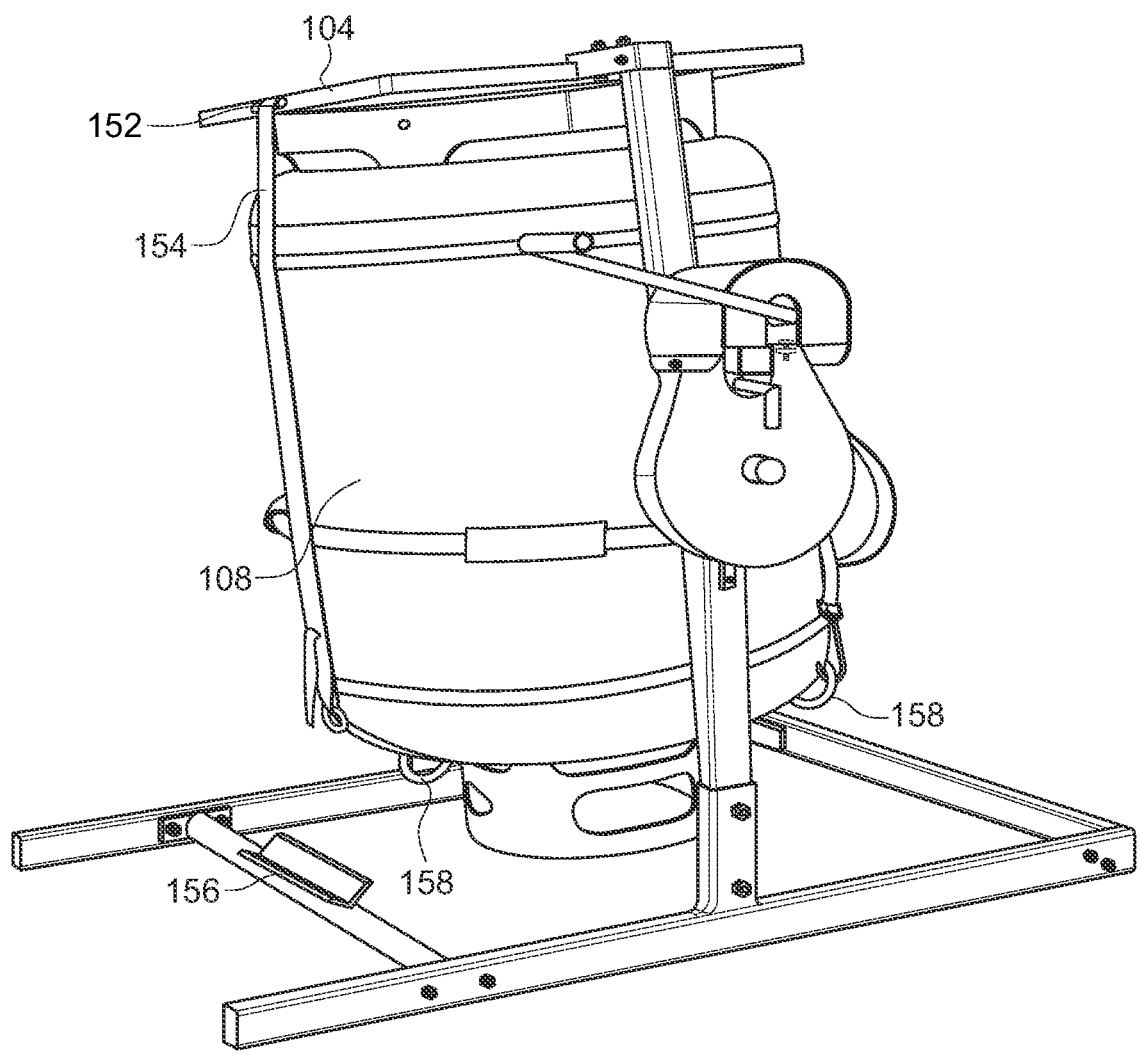
FIG. 5 illustrates an upright tank in an inverted position in accordance with certain embodiments.

FIG. 5 depicts an upright tank 108 in an inverted position in accordance with certain embodiments. Once the inverter swinging assembly 200 and the upright tank 108 are in a desired position (e.g., fully inverted as shown in FIG. 5 or partially inverted, e.g., in a horizontal orientation as shown in FIG. 4), pin 146 may be inserted through the pipe 148 or other guide mechanism, through teeth of the second sprocket 132, to disable movement of the second sprocket 132 to lock the tank inverter 100 and the affixed tank 108 into a fixed position.

Thus, upright tank 108 may be turned as desired and locked in place by pin 146 for liquid evacuation or other tank maintenance (e.g., painting). The upright tank then may be returned to its original position for dismounting by reversing the lifting process (e.g., removing the pin 146 and allowing the crank handle 144 to rotate in the reverse direction).

Although embodiments herein are described with respect to an upright propane tank, the embodiments may be adapted to any suitable tank, such as a tank to store any suitable type of gas (e.g., a gas tank) or liquid.

Although in the depicted embodiments the primary force for turning swing arm shaft 120 is provided by the handle 144 and the sprocket and chain system, in other embodiments the force for turning swing arm shaft 120 may be provided by other suitable components or systems, such as an electric motor or other suitable rotary actuator.

Reference throughout this specification to "one embodiment" or "an embodiment" means that a particular feature, structure, or characteristic described in connection with the embodiment is included in at least one embodiment of the present disclosure. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the foregoing specification, a detailed description has been given with reference to specific exemplary embodiments. It will, however, be evident that various modifications and changes may be made thereto without departing from the broader spirit and scope of the disclosure as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but may refer to different and distinct embodiments, as well as potentially the same embodiment.

What is claimed is:

1. An apparatus comprising:
   an inverter assembly comprising:
   a base plate to interface with a bottom of an upright gas tank;
   a rotatable shaft;
   at least one swing arm coupled to the base plate and the rotatable shaft;
   a base frame;
   a frame arm extending upwards from the base frame; and
   a first bearing within the frame arm;
   wherein the rotatable shaft is placed through and rotates within the first bearing within the frame arm, wherein the inverter assembly is to pivot about a horizontal axis to swing the base plate and a bottom side of an upright gas tank placed thereon in an upward arc responsive to rotation of the rotatable shaft; and
   wherein the inverter assembly is configured to invert the gas tank.

2. The apparatus of claim 1, wherein the base plate is elevated above the ground when the base plate is in its lowest position.

3. The apparatus of claim 1, wherein the swing arm extends generally vertically from a side of the base plate.

4. The apparatus of claim 1, wherein the base plate comprises an aperture at its center to interface with a base of the gas tank.

5. The apparatus of claim 1, wherein the base plate is coupled to a first swing arm on one side of the base plate and to a second swing arm on another side of the base plate, wherein the first swing arm and the second swing arm pivot about the horizontal axis to swing the base plate.

6. The apparatus of claim 1, wherein the rotatable shaft is rotated responsive to cranking of a handle.

7. The apparatus of claim 6, wherein the handle is coupled to a first sprocket via a drive shaft, the first sprocket is coupled via a chain to a second sprocket, and the second sprocket is coupled to and turns the rotatable shaft to pivot the inverter assembly about the axis.

8. The apparatus of claim 1, further comprising a base frame and a pair of frame arms extending upwards from the base frame, each frame arm is coupled through a respective rotatable shaft to a respective swing arm of the at least one swing arm.

9. The apparatus of claim 1, wherein the inverter assembly is to pivot into and be locked in a fully inverted position.

10. The apparatus of claim 1, wherein the inverter assembly is to pivot from a partially inverted position in which the upright gas tank is in a horizontal position towards a fully inverted position in which the upright gas tank is in an upside down vertical position.

11. The apparatus of claim 1, wherein the upright gas tank is an upright propane tank.

12. The apparatus of claim 1, wherein the frame arm extends upward past the bushing.

13. The apparatus of claim 1, a frame pocket attached to a side of the base frame and extending orthogonally from the base frame, wherein the frame arm is inserted into the frame pocket.

14. The apparatus of claim 1, wherein the rotatable shaft extends from the bushing, past the frame arm, and through a sprocket and hub, wherein the rotatable shaft is secured to the hub.

15. The apparatus of claim 1, further comprising a frame arm extension coupled to the frame arm, wherein a pair of bearings are mounted on the frame arm extension and secured to a drive shaft, wherein a crank handle is attached to an end of the drive shaft.

16. The apparatus of claim 1, further comprising a pin with a handle to slide into a void between teeth of a sprocket, to lock the inverter assembly into an at least partially inverted position.

17. The apparatus of claim 1, further comprising a pair of rounded fittings attached to opposite sides of the base plate to interface with a strap securing the upright gas tank.

18. The apparatus of claim 1, further comprising an angle mount attached to a front of the base frame to provide a receiving area for a fulcrum of a tank cart transporting the upright gas tank.

\* \* \* \* \*